(No Model.) 2 Sheets—Sheet 1.
B. D. AYARS, Jr.
PREVENTING MOISTURE ON WINDOWS.
No. 509,715. Patented Nov. 28, 1893.
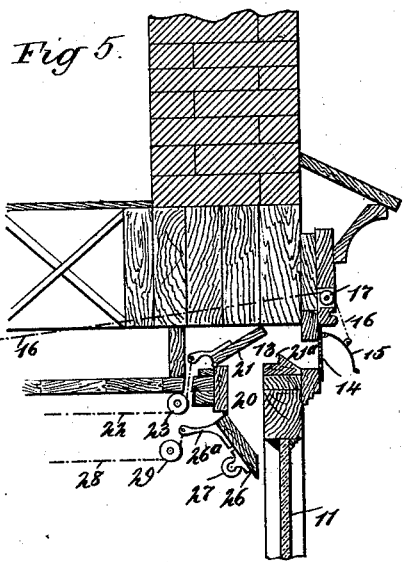
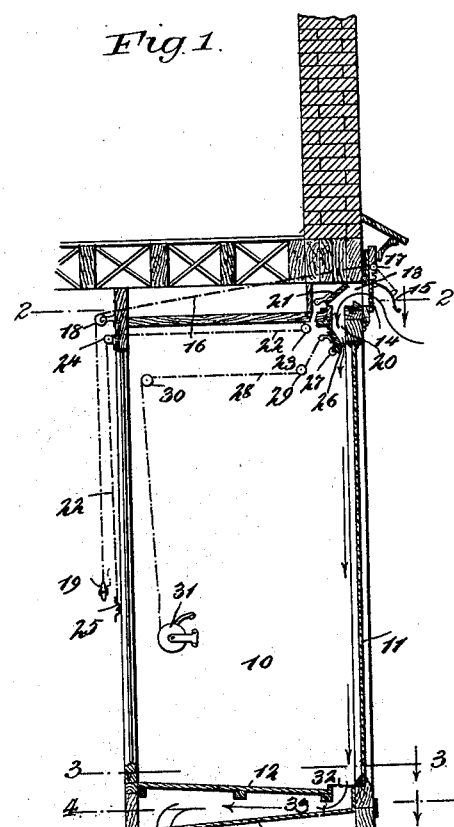
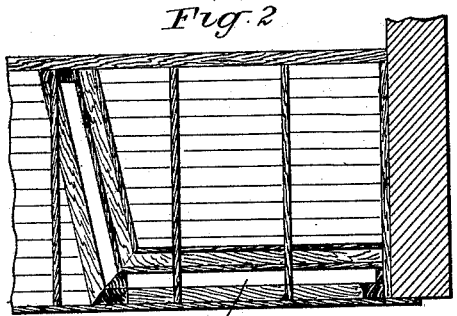
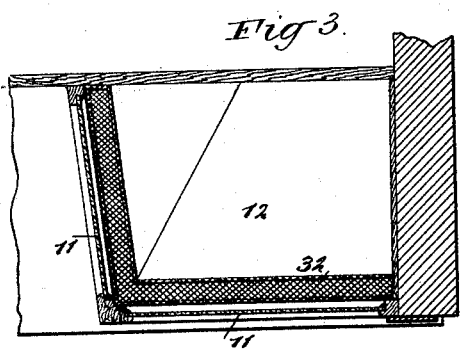
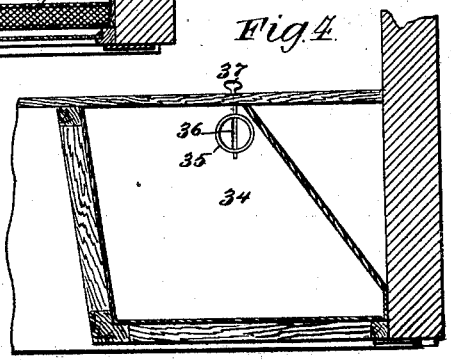
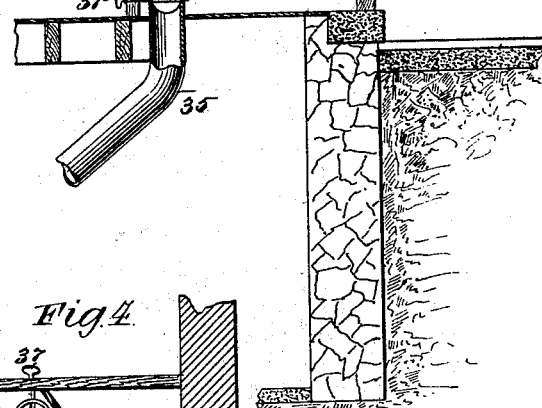
WITNESSES:
INVENTOR
B. D. Ayars Jr.
BY Munn & Co.
ATTORNEYS.

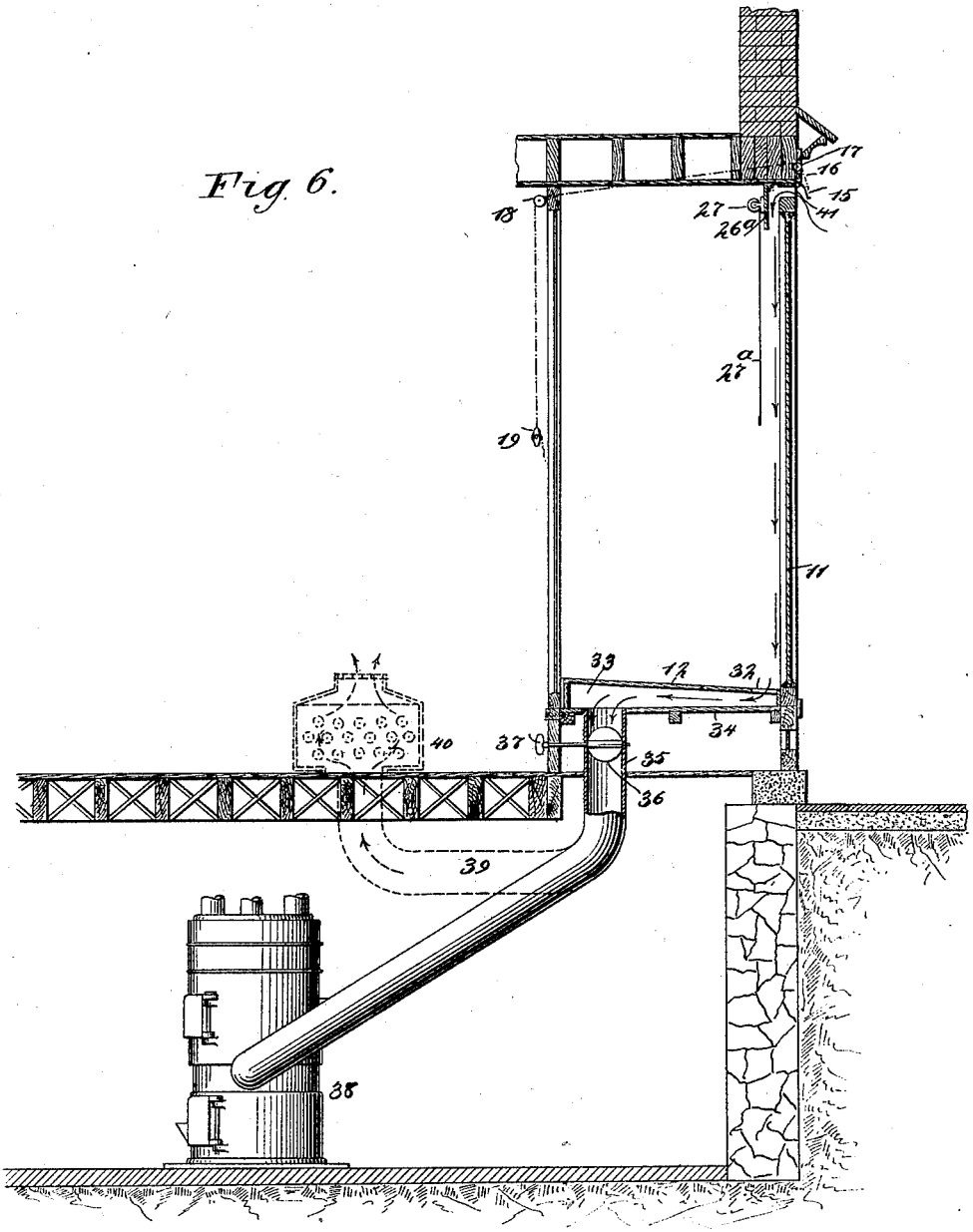

UNITED STATES PATENT OFFICE.

BENJAMIN D. AYARS, JR., OF CHESTER, PENNSYLVANIA.

PREVENTING MOISTURE ON WINDOWS.

SPECIFICATION forming part of Letters Patent No. 509,715, dated November 28, 1893.

Application filed March 31, 1893. Serial No. 468,513. (No model.)

*To all whom it may concern:*

Be it known that I, BENJAMIN D. AYARS, Jr., of Chester, in the county of Delaware and State of Pennsylvania, have invented a certain new and useful Improvement in Apparatus for Preventing Moisture on Windows, of which the following is a full, clear, and exact description.

My invention relates to an improved apparatus for preventing accumulation of moisture and ice on show windows.

In carrying out my invention I cause a current of cold air, of the same density and temperature of the window glass and of the outside air, to move continuously over the entire inner surface of the glass so as to carry away the moisture next the glass and also prevent any of the moist warm air in the building from coming into contact with the glass. It is well known that the accumulation of frost and ice on windows is caused by the collection on the glass of the moisture in the air and the freezing of said moisture, and it is obvious that if the moist air is kept out of contact with the glass, the glass will remain clear. In previous attempts to shield the interior of the glass by a current of cold air, efforts have been made to move the air in an upward direction over the glass, but such movement cannot be successfully accomplished.

My invention works on natural principles, and provides for the exhaustion of the lower stratum of air next the window glass and the natural downward movement of cold air which is admitted at the top of the window and which passes downward to replace the air previously exhausted.

The invention consists in the construction and combination of parts as hereinafter fully described and pointed out in the claims.

Reference is to be had to the accompanying drawings forming a part of this specification, in which similar figures of reference indicate corresponding parts in all the views.

Figure 1 is a central vertical section of a window and of the ceiling above and the floor below, showing my improved construction in connection with the window. Fig. 2 is a sectional plan on the line 2—2 in Fig. 1. Fig. 3 is a floor plan on the line 3—3 in Fig. 1. Fig. 4 is a sectional plan on the line 4—4 in Fig. 1. Fig. 5 is an enlarged detail sectional view of the upper portion of the window; and Fig. 6 is a sectional view similar to Fig. 1, but showing the application of my improved method and construction to a whole building.

The show window 10 may be of any ordinary kind and it is provided with the glass 11 and floor 12 common to show windows. Above the window and next the outer wall of the building, is a cold air box 13 which connects with the outer air through a screen-covered opening 14 and which is as wide at least as the window. The screen-covered opening 14 is protected by a swinging shield 15 hinged just above the opening and adapted to close down over it. The shield, when partially raised, as in Fig. 1, permits the air to pass in but it guards, in a measure, against any foreign matter entering the air box although the screen accomplishes this purpose. The shield may, however, be dropped so as to close the opening in summer time or when it is not desirable to admit air. The shield is operated by means of a cable 16 which passes upward over a pulley 17 in the wall of the building and inward over a guide pulley 18 and down to a convenient cleat 19 which is arranged near the window and to which the cable may be fixed. The air box connects with the upper portion of the window, near the top of the glass, by means of a passageway 20 which may be closed by a damper 21 adapted to close against a seat 21ª, see Fig. 5, and this damper is raised by means of a cable 22 which passes inward and downward over guide pulleys 23 and 24 to a cleat 25 to which it may be made fast. At the lower end of the passageway 20, which is of the same width as the window, is a hinged deflector 26 which is of the same length as the passageway 20 and which normally hangs in a vertical position. This deflector carries upon its back a curtain fixture 27 which may be of any suitable kind and to which a curtain 27ª may be hung, as shown in Fig. 6, and the curtain serves the ordinary purpose of shading the window and also assists incidentally in guiding the cold air current over the glass 11. To an arm 26ª on the back of the deflector 26 is secured a cable 28 which extends inward and downward over suitable guide pulleys 29 and 30 and is made fast to a reel 31 on one side of the window. It will be seen that by drawing on the cable 28 the deflector 26 may be swung toward the glass, as in Figs. 1 and 5, and thus the descending current of cold air is directed against the glass 11 and is dropped, by its natural density, downward over the face of the glass. Extending around the base of the glass in the floor 12 of the window, is an opening 32, through which the cold air passes after leaving the glass and through which the warmer air is exhausted to start the current. This opening is covered by a suitable screen and it leads to a compartment 33 beneath the floor 12 of the window, and a false bottom 34, which is arranged beneath the floor. From this compartment 33 leads a pipe 35 which extends downward to the floor below and which is controlled by a damper 36, the stem or handle 37 of which projects inward through the window casing to a point where it may be conveniently reached and turned. The pipe 35 may be connected with any exhaust pipe or any pipe having a draft, but a convenient method of creating the necessary draft is to connect it with a furnace 38 so as to supply the necessary cold air to the furnace and thus the pipe serves a double purpose. It may, however, be connected as shown at 39 in Fig. 6, with a steam heater 40, or in fact with any heater which employs a current of air and heats it so as to eject it warm into a room. As soon as the draft is started in the furnace in the usual way by heating the cold air, the air from the base of the glass 11 passes downward through the pipe 35 to the furnace and from the furnace to the rooms warmed in the usual way, while the air displaced at the base of the glass is replaced by the cold air which enters from the air box 13, and thus a continuous current of cold air passes over the glass and prevents the warm air in the room from coming into contact therewith.

In applying my invention to a new building, the construction shown in Figs. 1 and 5 and described above is preferably employed, but in applying it to an old building an air passage 41 may be made in the top rail of the window and the entering air may be deflected against the window by a deflector 26ª, the current of air being also guided in its course by the curtain 27ª which hangs from the back of the deflector. The aperture 41 may be screened and protected in the manner already described.

Having thus described my invention, I claim as new and desire to secure by Letters Patent—

1. The combination, with a window having an opening near the base of its glass, of an exhaust pipe arranged to withdraw the air through said base opening, a cold air inlet arranged at the top of the glass, and means for deflecting the cold air over the surface of the glass, substantially as described.

2. The combination, with a window, of an exhaust pipe arranged to withdraw the air from the inside of the window at the base of the glass, a cold air inlet near the top of the glass, and an adjustable deflector to guide the cold air to the glass, substantially as described.

3. The combination with a window, of a compartment arranged beneath the floor of the window and having an opening near the base of the glass, an exhaust pipe to withdraw the air from the compartment, a cold air inlet at the top of the window, and a deflector to guide the cold air to the window glass, substantially as described.

4. The combination with a window, of an exhaust pipe arranged to withdraw the air from the lower portion of the window near the base of the glass, a cold air inlet near the top of the glass, a deflector to guide the air upon the inner surface of the glass, and a damper to control the inlet, substantially as described.

5. The combination with a window, of an apparatus to withdraw the air from the base of the window, near the bottom of the glass, a cold air inlet leading from the exterior of the window to a point within the window and near the top of the glass, and a movable shield arranged to cover the cold air inlet, substantially as described.

6. The combination with a window, of means for withdrawing the air from the base of the window, a cold air box arranged near the window top and connected with the outer air, and a passageway opening from the cold air box and delivering upon the upper portion of the glass, substantially as described.

BENJAMIN D. AYARS, JR.

Witnesses:
W. I. SCHAFFER,
GEO. W. LYNCH.